(12) United States Patent
Lee et al.

(10) Patent No.: US 7,831,203 B2
(45) Date of Patent: Nov. 9, 2010

(54) RADIO FREQUENCY REPEATER FOR CANCELLING FEEDBACK INTERFERENCE SIGNAL WITH BUILT IN ANTENNA

(75) Inventors: Seong Jae Lee, Seoul (KR); Mi Ja Lee, Gyeonggi-Do (KR); Chang Soon Kim, Incheon (KR); Hyeong Soo Choi, Gyeonggi-Do (KR)

(73) Assignee: RF Window Co. Ltd, Seoul (KR)

( * ) Notice: Subject to any disclaimer, the term of this patent is extended or adjusted under 35 U.S.C. 154(b) by 556 days.

(21) Appl. No.: 11/944,695

(22) Filed: Nov. 26, 2007

(65) Prior Publication Data
US 2008/0125033 A1    May 29, 2008

(30) Foreign Application Priority Data
Nov. 24, 2006   (KR)  ............... 10-2006-0116840

(51) Int. Cl.
*H04Q 7/20* (2006.01)
(52) U.S. Cl. .................. 455/22; 455/7; 455/11.1; 455/24; 455/550.1; 455/90.3; 370/315; 370/310; 370/318; 343/702; 343/824

(58) Field of Classification Search ............ 455/22, 455/7, 11.1, 24, 20, 422.1, 550.1, 500, 517, 455/90.1–90.3, 414.1–414.2, 423–425, 67.11; 370/315, 310, 318; 343/702, 824
See application file for complete search history.

(56) References Cited
U.S. PATENT DOCUMENTS

| | | | |
|---|---|---|---|
| 6,934,511 B1 * | 8/2005 | Lovinggood et al. | 455/11.1 |
| 2001/0038670 A1 * | 11/2001 | Whight | 375/267 |
| 2003/0211827 A1 * | 11/2003 | Yonezawa et al. | 455/7 |
| 2010/0136966 A1 * | 6/2010 | Pergal | 455/422.1 |

* cited by examiner

*Primary Examiner*—Keith T Ferguson
(74) *Attorney, Agent, or Firm*—Laurence A. Greenberg; Werner H. Stemer; Ralph E. Locher

(57) ABSTRACT

The present invention relates to a Radio Frequency Repeater to prevent oscillation with canceling a feedback interference signal between transmitting and receiving antenna with built-in transmitting and receiving antenna in wireless mobile communication repeater. A radio frequency repeater for canceling a feedback interference signal has a downlink path from a base station to a terminal and an uplink path from a terminal to a base station, and said downlink path and said uplink path is separated and combination by a duplexer.

10 Claims, 9 Drawing Sheets

RADIO FREQUENCY REPEATER FOR CANCELLING FEEDBACK INTERFERENCE SIGNAL WITH BUILT IN ANTENNA

TECHNICAL FIELD

The present invention relates to a radio frequency repeater for canceling feedback interference signal with built in antenna, in more detail, said radio frequency repeater is that built-in a donor antenna in which receives a sender signal transmitted from a base station of mobile telecommunication radio frequency repeater and a coverage antenna in which radiates a signal relayed in said RF Repeater to the area of service, and to prevent an oscillation with cancellation of feedback interference signal between said donor antenna and said coverage antenna.

BACKGROUND ART

Generally, in case of wireless telecommunication network of a mobile telecommunication system, due to the local restriction, there is existed a small amplitude blocked shadow zone or an impossible shielded space for transmitting and receiving of mobile telecommunication terminal. The shadow zone can be included all area having a topographic structure which intensity of propagation is extremely low by nature and artificial obstacle such as a mountain, a basement of the building, an inside of building, and so on.

The radio frequency repeater is commonly used as apparatus to be possible for receiving and transmitting of a mobile telephone and a radio paging from frequency shadow region with using a method of re-radiating amplified signal through antenna after eliminating noise to select a weak signal that relays in the existing signal in shield space and shadow region in which frequency arrival is difficult, such as mountains, tunnels, underground parking area or buildings. This radio frequency repeater operates a function to relay with re-amplified signal of the base station so as to have a good quality of service in whenever and from anywhere with covering frequency shadow region and shielded space in existing service area of a base station.

Said radio frequency repeater is connected a donor antenna means for receiving and transmitting wireless signal with a base station and a coverage antenna means for receiving and transmitting wireless signal with a mobile telecommunication terminal. The donor antenna receives a downlink signal of the mobile telecommunication terminal from the base station and amplifies the download signal in the radio frequency repeater and then transmits amplified download signal to the mobile telecommunication terminal through the coverage antenna, and the coverage antenna receives uplink signal of the base station from the mobile telecommunication terminal and amplifies the uplink signal, and then transmits the uplink signal to the base station through the donor antenna.

However, FIG. 1 illustrates a drawing of linkage for antenna of outdoor type radio frequency repeater in the prior art that shows a donor antenna (10) and a coverage antenna (20) is separated from a radio frequency repeater (30), and operates with using by a patch antenna or a yagi antenna of outdoor type for ensuring an isolation between the donor antenna (10) and the coverage antenna (20), the radio frequency repeater (30) of the prior art need to set up the donor antenna (10) and the coverage antenna (20) when the radio frequency repeater (30) is set up in a telegraph pole or a separate frame.

Moreover, FIG. 2 illustrates a drawing for antenna installation of indoor small amplitude output radio frequency repeater and indoor radio frequency repeater with built-in a patch antenna of the prior art. As showing said FIG. 2, it is a coverage antenna with built-in a patch antenna and shows to use with connecting a donor antenna (10) for ensuring isolation between receiving and transmitting antenna of radio frequency repeater (30) by RF (Radio Frequency) cable (40), to use one-body type radio frequency repeater with an omni antenna instead of a patch antenna, but the donor antenna (10) must use as separating or shielding with radio frequency repeater (30) for ensuring isolation.

DISCLOSURE OF INVENTION

Technical Problem

As mentioned-above, however a donor antenna and a coverage antenna in wireless radio relay system including a radio frequency repeater is having an installed structure separately as independent with a radio frequency repeater, thus this has a problem that it needs additional cable for connecting each antenna with radio frequency repeater, and it needs to control location of a radio frequency repeater and antenna when the radio frequency repeater is installed, thus the installation is difficult if an installer is not an expert.

Also, said radio frequency repeater has another problem to occur oscillation of said radio frequency repeater by feedback signal to be formed feedback loop that a transmitted signal to a coverage antenna is back to a donor antenna.

Technical Solution

The present invention has an object for overcoming the above-mentioned problem to provide a radio frequency repeater for canceling feedback interference signal with built-in antenna to enable to make mass-produced radio frequency repeater as unification of antenna and radio frequency repeater so that it is convenient for use and installation of a user.

Another object of the present invention for overcoming the above-mentioned problem is to provide a radio frequency repeater for canceling feedback interference signal with built-in antenna to enable to obtain cost-saving effect on installation and maintenance with making simple installation and maintenance of the radio frequency repeater.

The other object of the present invention for overcoming the above-mentioned problem is to provide a radio frequency repeater for canceling feedback interference signal with built-in antenna and a feedback interference signal cancellation part means for preventing oscillation of a radio frequency repeater by feedback signal between antennas.

Advantageous Effects

As the above-mentioned, a radio frequency repeater for canceling feedback interference signal with built-in antenna according to the present invention improves as epochal-making for separating and shielding of a donor antenna and a coverage antenna for ensuring isolation according to the prior art, mounts either vertically or horizontally, and has an effect to give easy to control of antenna direction in mobile telecommunication service to be possible to control either vertically or horizontally antenna direction inside of said radio frequency repeater.

Moreover, a radio frequency repeater for canceling feedback interference signal with built-in antenna according to the present invention has an effect to ensure isolation to be lacked in built-in antenna with built-in cancellation module for feedback interference signal, to cancel multi-path feedback interference signal, and to be possible to operate stably mobile telecommunication network to cancel changeable feedback interference signal by change of circumstances.

Finally, a radio frequency repeater for canceling feedback interference signal with built-in antenna according to the present invention has an effect that it is easy to install for information about feedback interference signal in operation because it is possible for monitoring with GUI (Graphic User Interface) in monitoring control terminal for feedback interference signal.

DESCRIPTION OF DRAWINGS

The present invention will become better understand with reference to the accompanying drawings in which are given only by way of illustration and thus are not limitative of the present invention, wherein.

BEST MODE

For achievement of the above-mentioned object, the present invention is built-in of a donor antenna receiving a transmitted sender signal from a base station to a mobile telecommunication radio frequency repeater and a coverage antenna radiating a repeated signal in said radio frequency repeater to a radio service area, relates to a radio frequency repeater preventing oscillation to cancel feedback interference signal between said donor antenna and said coverage antenna, said radio frequency repeater for canceling feedback interference signal with built-in antenna has a downlink path from a base station to a terminal and a uplink path from a terminal to a base station, and said downlink path and said uplink path is separated and combined by a duplexer. Said radio frequency repeater of the present invention is built-in as one-body type of a donor antenna and a coverage antenna with a radio frequency repeater, and is built-in ICM (Interference Cancellation Module) for preventing oscillation of a radio frequency repeater by feedback signal between antennas.

MODE FOR INVENTION

Figure 3:
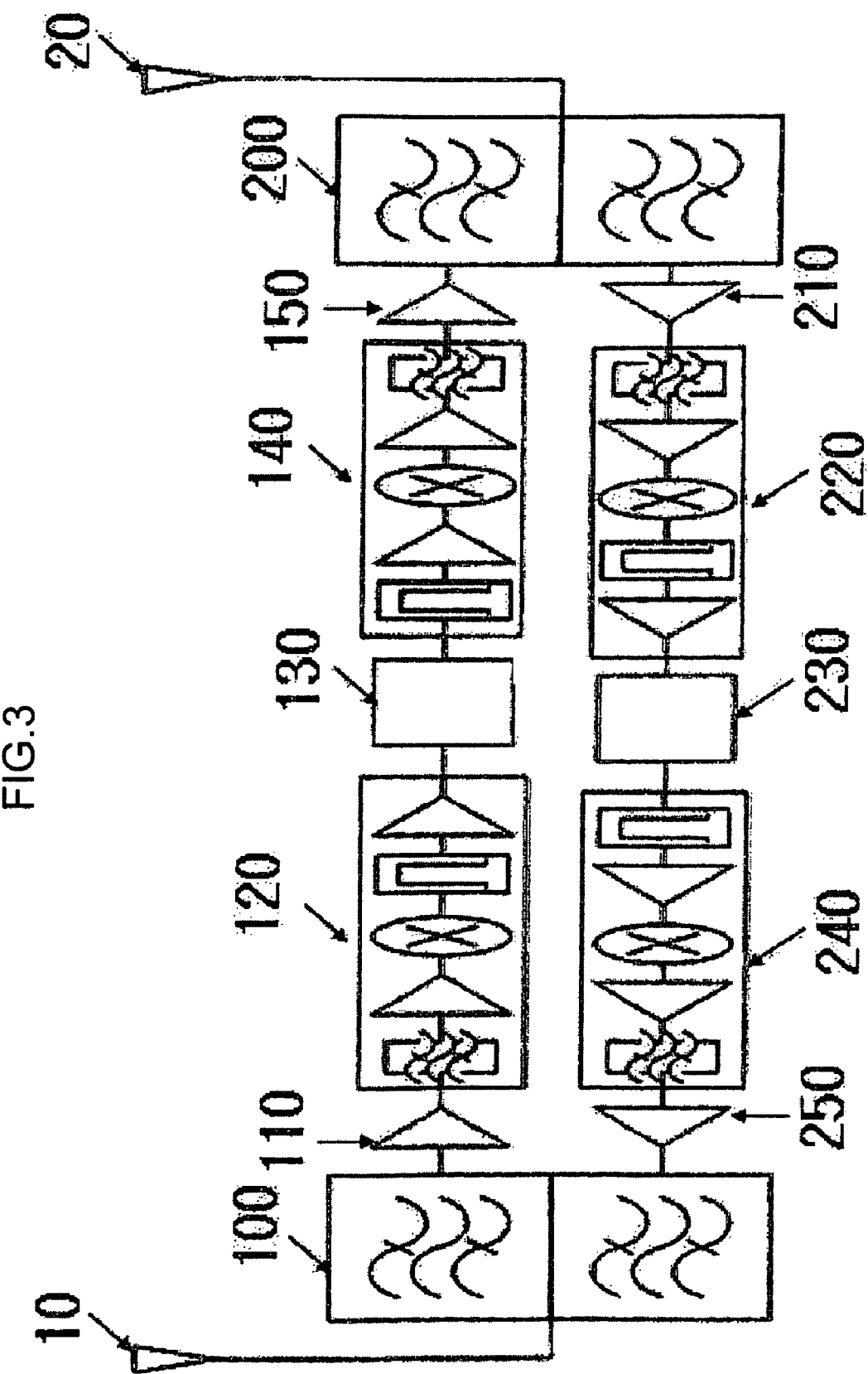
FIG. 3 illustrates an entire configuration of a radio frequency repeater for canceling feedback interference signal with built-in antenna according to the present invention.

Other advantages and features of the invention will be appreciated from the following description in detail with reference to the accompanying drawings, in which:

FIG. 3 shows an entire configuration of a radio frequency repeater for canceling feedback interference signal with built-in antenna according to the present invention.

As shown in FIG. 3, the present invention is built-in of a donor antenna (10) receiving a transmitted sender signal from a base station to a mobile telecommunication radio frequency repeater and a coverage antenna (20) radiating a repeated signal in said radio frequency repeater to a radio service area, and relates to a radio frequency repeater preventing oscillation to cancel feedback interference signal between said donor antenna (10) and said coverage antenna (20), a radio frequency repeater for canceling feedback interference signal with built in antenna according to the present invention is comprising:

a $1^{st}$ duplexer (100) means for filtering received signal from said donor antenna (10);

a downlink low noise amplifier (110) means for amplifying a filtered signal only for use-band in said $1^{st}$ duplexer (100) by low noise;

a downlink frequency down converter (120) means for lowering a frequency by an intermediate frequency band to receive amplified signal by said downlink low noise amplifier (110);

a downlink feedback cancellation module (130) means for separating and canceling a received signal from base station to be inputted from said donor antenna (10) in a signal of said downlink frequency down converter (120) and a feedback interference signal to be inputted to a donor antenna (10) to radiate in said coverage antenna (20);

a downlink frequency up converter (140) means for raising frequency by a high frequency band for radiating a ultra pure intermediate frequency band signal to a service area which a feedback interference signal is cancelled by said downlink feedback ICM (Interference Cancellation Module) (130);

a downlink power amplifier (150) means for amplifying a signal of said downlink frequency up converter (140);

a $2^{nd}$ duplexer (200) means for outputting to a coverage antenna (20) with filtering a amplified signal in said downlink power amplifier (150);

conversely, a $2^{nd}$ duplexer (200) means for filtering to receive a signal of a mobile telecommunication terminal which is radiated from said coverage antenna (20) in a service area;

an uplink low noise amplifier (210) means for amplifying low noise to receive filtered signal only for use band in said $2^{nd}$ duplexer (200);

an uplink frequency converter (220) means for lowering frequency by intermediate frequency band to receive amplified signal by said uplink low noise amplifier (210);

an uplink feedback cancellation module (230) means for separating and canceling a received signal from a terminal of a service area to be inputted from said coverage antenna (20) in a signal of said uplink frequency down converter (220) and a feedback interference signal to be inputted to a coverage antenna (20) to radiate in said donor antenna (10);

an uplink frequency up converter (240) means for raising frequency by a high frequency band for radiating an ultra-pure intermediate frequency band signal to a service area, said ultra-pure intermediate frequency band signal is cancelled a feedback signal by said uplink feedback ICM (Interference Cancellation Module) (230);

an uplink power amplifier (250) means for amplifying a signal of said uplink frequency up converter (240); and a 1$^{st}$ duplexer (100) means for outputting to filter an amplified signal in said uplink power amplifier (250) to a donor antenna (10).

Hereinafter, each configuration of a radio frequency repeater for canceling feedback interference signal with built in antenna according to the present invention will be described in detail as follows:

Said 1$^{st}$ duplexer (100) in which receives a transmitted base station signal from a donor antenna (10) to be connected with said donor antenna (10), or filters with transmitting a transmitted base signal to said donor antenna (10) to go through uplink path from a coverage antenna (20). Oppositely, said 2$^{nd}$ duplexer (200) in which receives a transmitted terminal signal from a coverage antenna (20) to be connected with said coverage antenna, or filters with transmitting a transmitted base signal to a coverage antenna (20) to go through downlink path from a donor antenna (10).

Said amplifier (110, 150, 210, 250) performs a function of output to be amplified input signal by each fixed gain. In more detail, a downlink low noise amplifier (110) amplifies low noise to receive filtered signal only for use band in said 1$^{st}$ duplexer (100) among transmitted signals from a donor antenna (10), and a downlink power amplifier (150) amplifies as desired amplitude to be able to radiate outputted signal through a downlink path in said coverage antenna (20).

Similarly, an uplink low noise amplifier (210) amplifies low noise to receive a filtered signal only for use band in a 2$^{nd}$ duplexer (200) among transmitted terminal signal from a coverage antenna (20), and an uplink power amplifier (150) amplifies as desired amplitude to be able to radiate outputted signal through a uplink path in said donor antenna (10).

Here an inputted signal to a receiving antenna with using a micro processor technology and a digital processor technology is radiated to a transmitting antenna after filtering and amplifying, at this point, if a transmitting signal having a same frequency in a receiving antenna is inputted to be feedback to a receiving antenna, then a radio frequency repeater can cause a gradualness and a saturation of receiving signal of a terminal and a raising noise level in base station due to a oscillation. Also, feedback signal between transmitting and receiving antenna always changes a phase and amplitude by an environment.

The present invention consists of built-in ICM (Interference Cancellation Module) (130, 230) to be able to cancel only for a feedback signal with adapting actively for changeable feedback signal between sending and receiving signal.

Said feedback ICM (130, 230) can confirm by a supervisory control terminal to measure a feedback signal cancellation between sending and receiving antenna, an isolation measurement function between sending and receiving antenna, and a phase difference and amplitude for a time base of an interference signal.

Therefore, a downlink feedback ICM (Interference Cancellation Module) (130) filters a base signal inputted to a donor antenna (10) only for a use band in a 1$^{st}$ duplexer (100), and is amplified low noise in a downlink low noise amplifier (110). Said low noise amplified signal converts a radio frequency in downlink frequency down converter (120) to an intermediate frequency to be able to process in said downlink feedback ICM (Interference Cancellation Module) (130), and now said downlink feedback ICM (Interference Cancellation Module) (130) separates a feedback interference signal to be inputted to said donor antenna (10) to be radiated in said coverage antenna (20) and a signal from base station inputted a converted signal in said downlink frequency down converter (120) from said donor antenna, and then cancels said separated feedback interference signal.

And now an ultra-pure intermediate frequency band signal with a cancelled feedback signal by said downlink feedback ICM (Interference Cancellation Module) (130) raises frequency by high-frequency band for radiating from a downlink frequency up converter (140) to a service area.

As well as the above-mentioned, a terminal signal inputted to a coverage antenna (20) filters only for use band in 2$^{nd}$ duplexer (200) and is low noise amplifying in an uplink low noise amplifier (210). Said low noise amplified signal converts from a radio frequency in an uplink frequency down converter (220) to an intermediate frequency to be able to process in an uplink feedback ICM (Interference Cancellation Module) (230), and said uplink feedback ICM (Interference Cancellation Module) (230) separates a signal from base station inputted from said coverage antenna (20) and a feedback interference signal to be inputted to said coverage antenna (20) to be radiated in said donor antenna (10), and then after canceling said separated feedback interference signal, and now raises frequency by high frequency band for radiating from an uplink frequency up converter (240) to a service area.

At this point, in cancellation method of feedback interference signal, following description is more about downlink pass process: a first input signal of a radio frequency repeater only inputs a signal of base station, and a feedback loop is not made up because said base station signal is only inputted before said radio frequency repeater radiates a signal to a coverage antenna.

Figure 4:
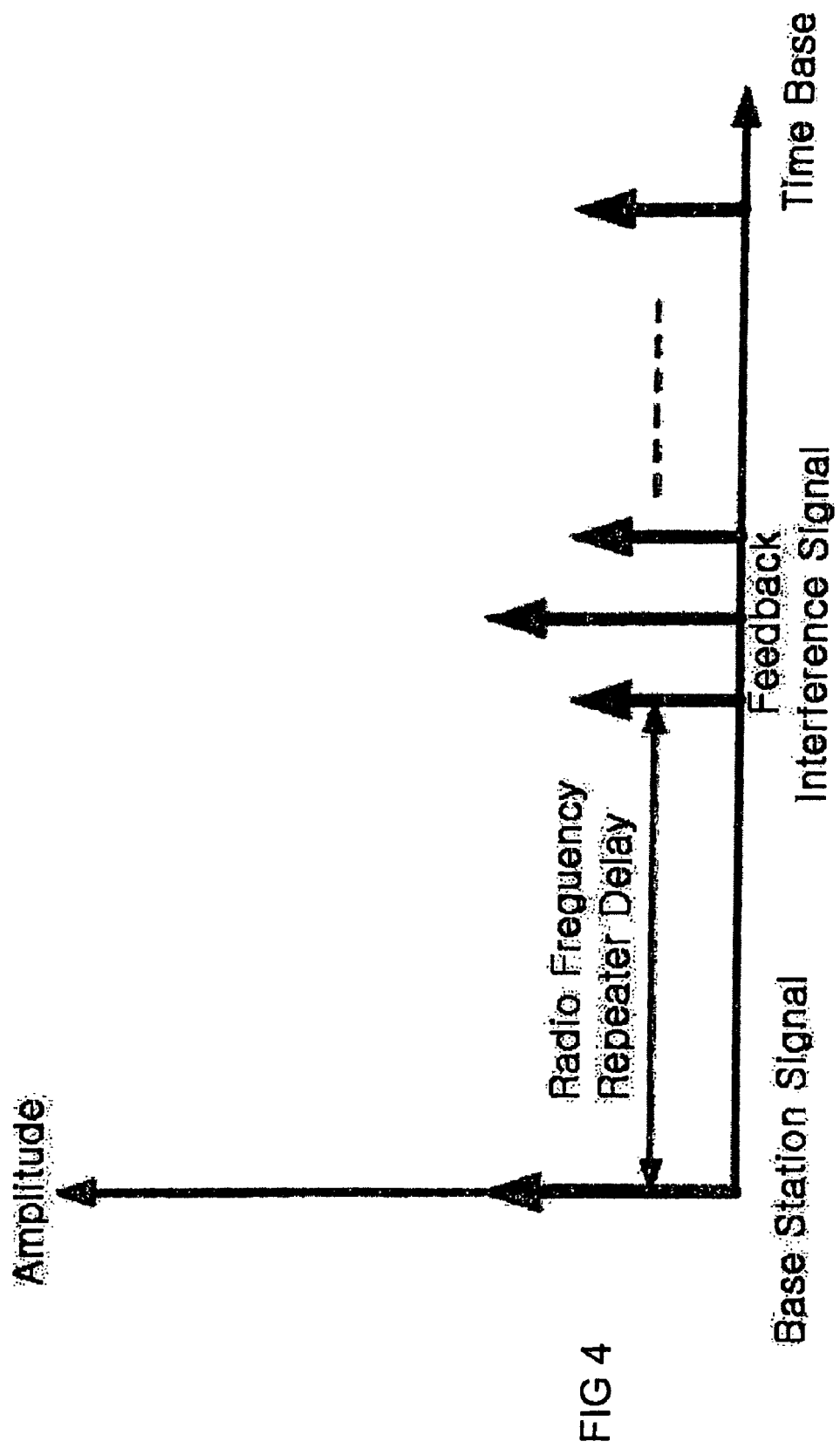
FIG. 4 illustrates a time graph showing signal by feedback loop and signal from base station.

However, if said radio frequency repeater radiates a signal to coverage antenna, then a feedback loop is made up, and then a combination of a feedback signal and an input signal from a base station is inputted to a donor antenna of said radio frequency repeater FIG. 4 illustrates a time graph showing signal by a feedback loop and a signal from a base station.

As shown in FIG. 4, in time base of a feedback interference signal and a signal from a base station, said feedback interference signal is inputted to a donor antenna slowly as time delay of a radio frequency repeater, in which said time delay is for timing from amplifying in a radio frequency repeater to radiating to a coverage antenna. Thus FIG. 4 shows that a feedback interference signal having multi-path is inputted as slower than a signal from a base station as time delay of said radio frequency repeater itself.

Figure 5:
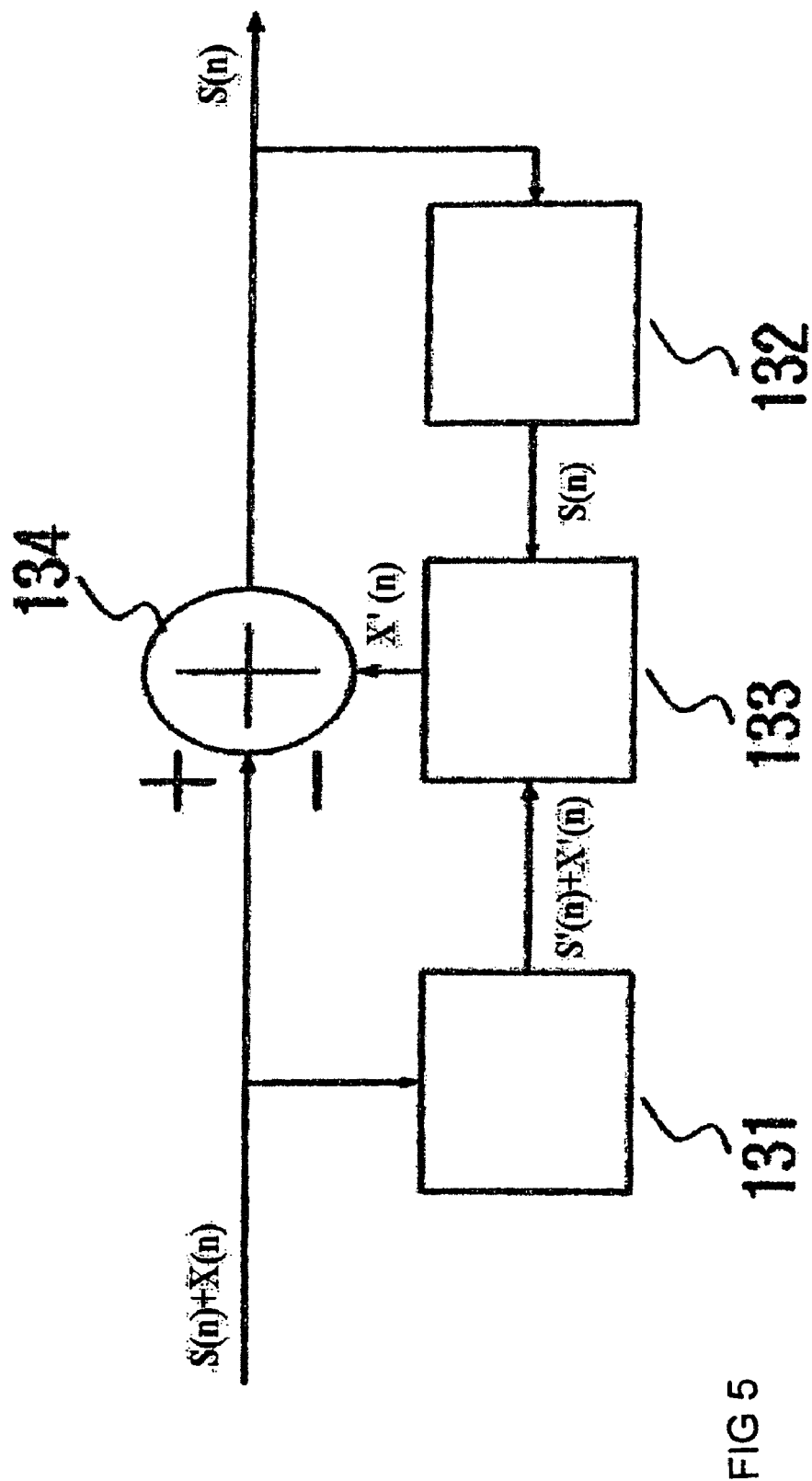
FIG. 5 is a detail block diagram of feedback interference signal canceling portion of radio frequency repeater for canceling feedback interference signal with built-in antenna according to the present invention.

FIG. 5 is a detail block diagram of a feedback interference signal canceling portion of radio frequency repeater for canceling feedback interference signal with built-in antenna according to the present invention. With FIG. 5, S(n) is a signal from a base station, X(n) is a feedback interference signal, S'(n) is a reverse phase signal of a signal from a base station signal, and X'(n) is a reverse phase signal of a feedback signal.

Thus, as shown in FIG. 5 for canceling said feedback interference signal, a feedback ICM (Interference Cancellation Module) is, about a signal of from a base station received from a receiving antenna and a re-received feedback interference signal from a transmission antenna, consists of a receiving signal delay unit (131) to delay a phase to a reverse phase signal, a transmitting signal delay unit (132) to transmit only a base station signal to be transmitted to said transmitting antenna, a canceller (133) to sort only a feedback interference signal to combine a reverse phase signal of said a receiving signal delay unit (131) and a signal from a base station of before sending of said transmitting signal delay unit (132), and an adder-subtracter (134) to sort only a received signal from a base station to combine a transmitted reverse phase signal of a feedback interference signal from said canceller (133) with a received signal of from a base station and a feedback interference signal.

Therefore, for sorting only a feedback interference signal, a signal from a base station in said feedback interference signal cancellation module (130) has to be cancelled. Said signal from a base station (S(n)) is cancelled as to input into said canceller (133) to a reverse phase signal of said signal from a base station signal (S'(n)) using said receiving signal delay unit (131) and said transmitting signal delay unit (132) for outputting base station signal from an adder-subtracter (134). Then there remains only a reverse phase of a feedback interference signal (X'(n)), and then said feedback interference signal is cancelled as to input said reverse phase of a feedback interference signal (X'(n)) into an adder-subtracter (134). Also said feedback interference signal cancels feedback interference signals in multi-path because said feedback interference signal cancellation module (130) have many cells of a canceller.

And a location and amplitude of isolation and a feedback interference signal of radio frequency repeater can be known with radio monitoring to calculate numbers of a feedback interference signal cancellation in a feedback interference cancellation module.

Figure 1:
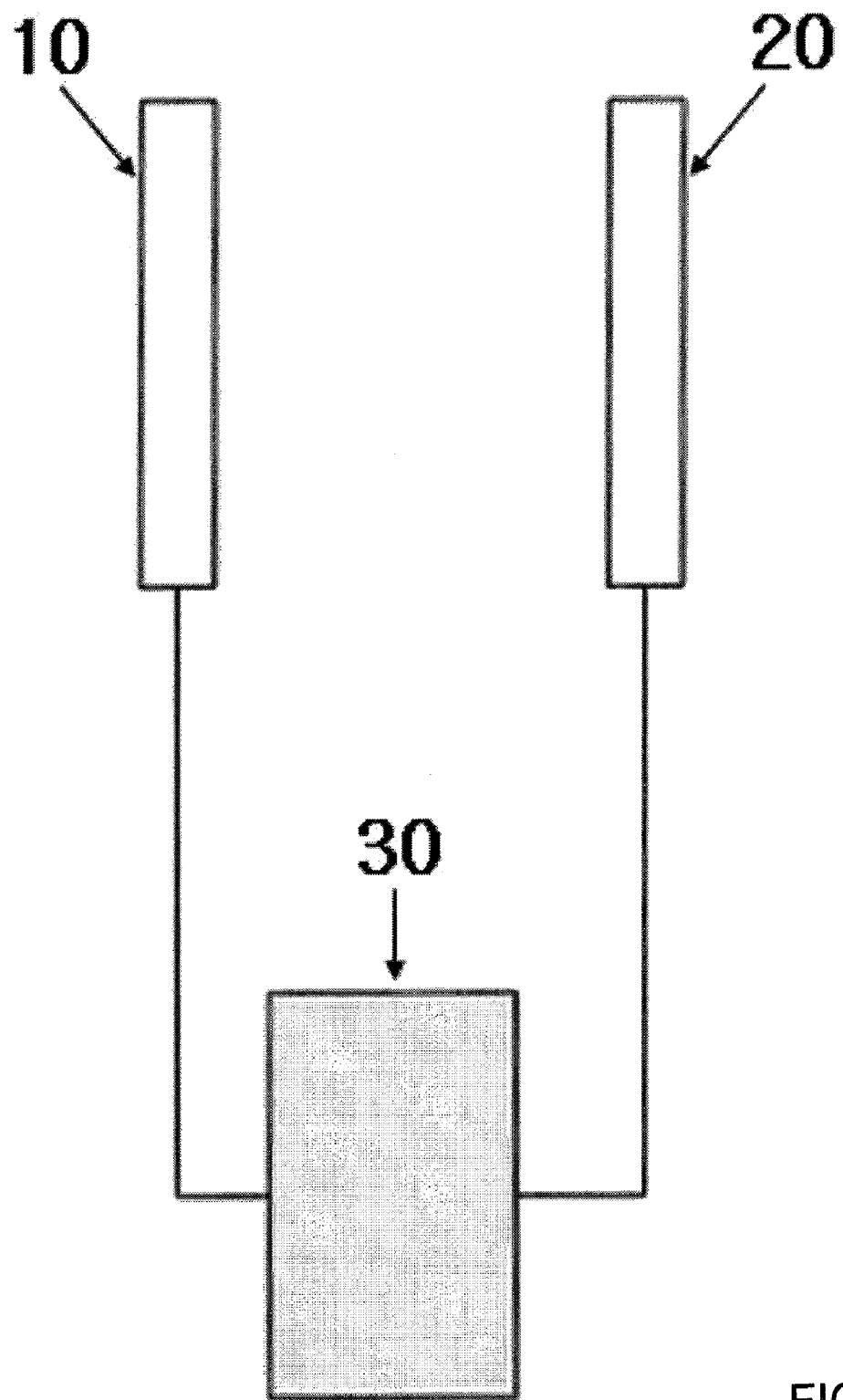
FIG. 1 is a generic block diagram of a conventional radio frequency repeater antenna.
Figure 2:
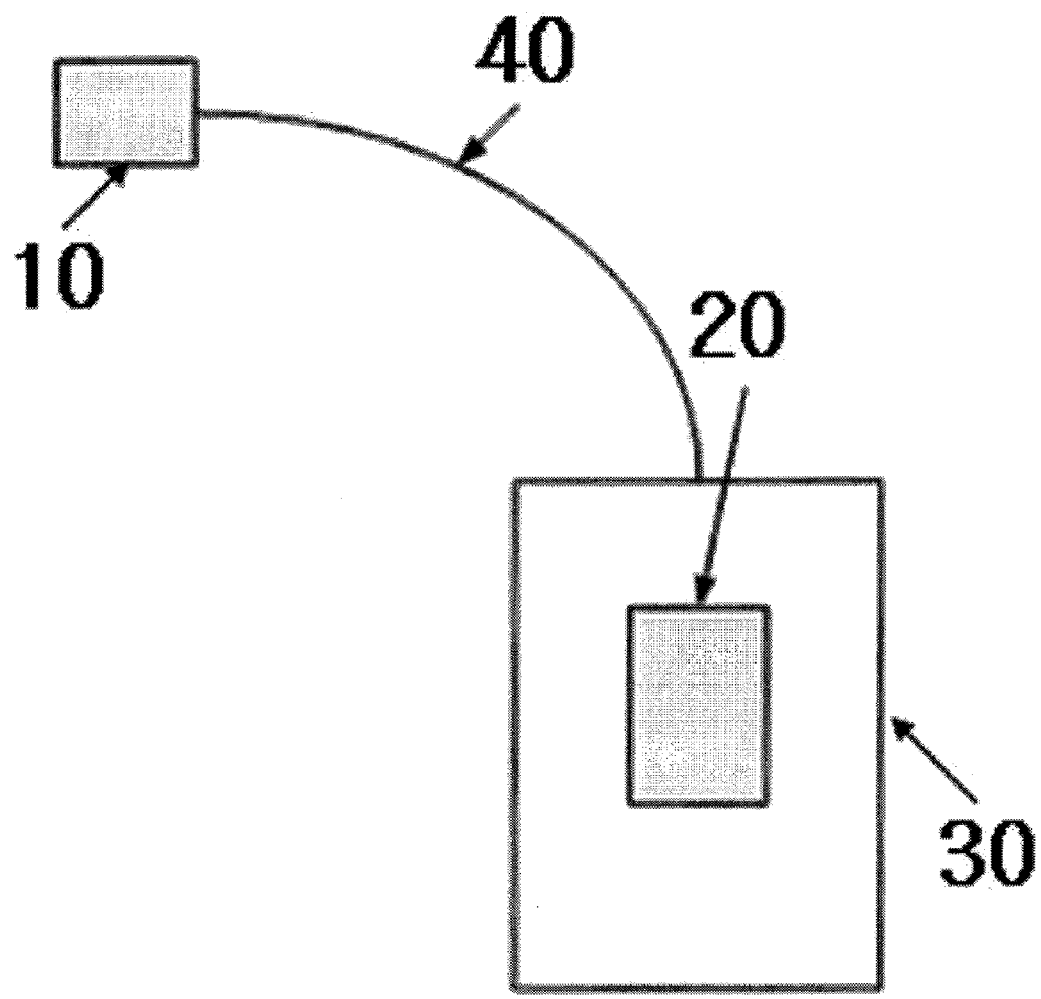
FIG. 2 is a block diagram of a conventional indoor repeater with built-in patch antenna.

Isolation can be calculated as following Math Figure 1:

$$\text{Isolation} = \text{Gain} - [\text{Log}_{10}|W'(n)| - \text{Log}_{10}|S'(n)|] \quad \text{[Math Figure 1]}$$

|W'(n)|: Feedback Interference Signal Level
|S'(n)|: Received Signal Level from Base Station For instance, if gain of a radio frequency repeater is 90 dB, then the math equation is as Isolation=90.0−[$\text{Log}_{10}$|W'(n)|−$\text{Log}_{10}$|S'(n)|]. Thus, isolation is the same as a gain of a radio frequency repeater if a feedback interference signal level is the same as a received signal level from a base station.

Figure 6:
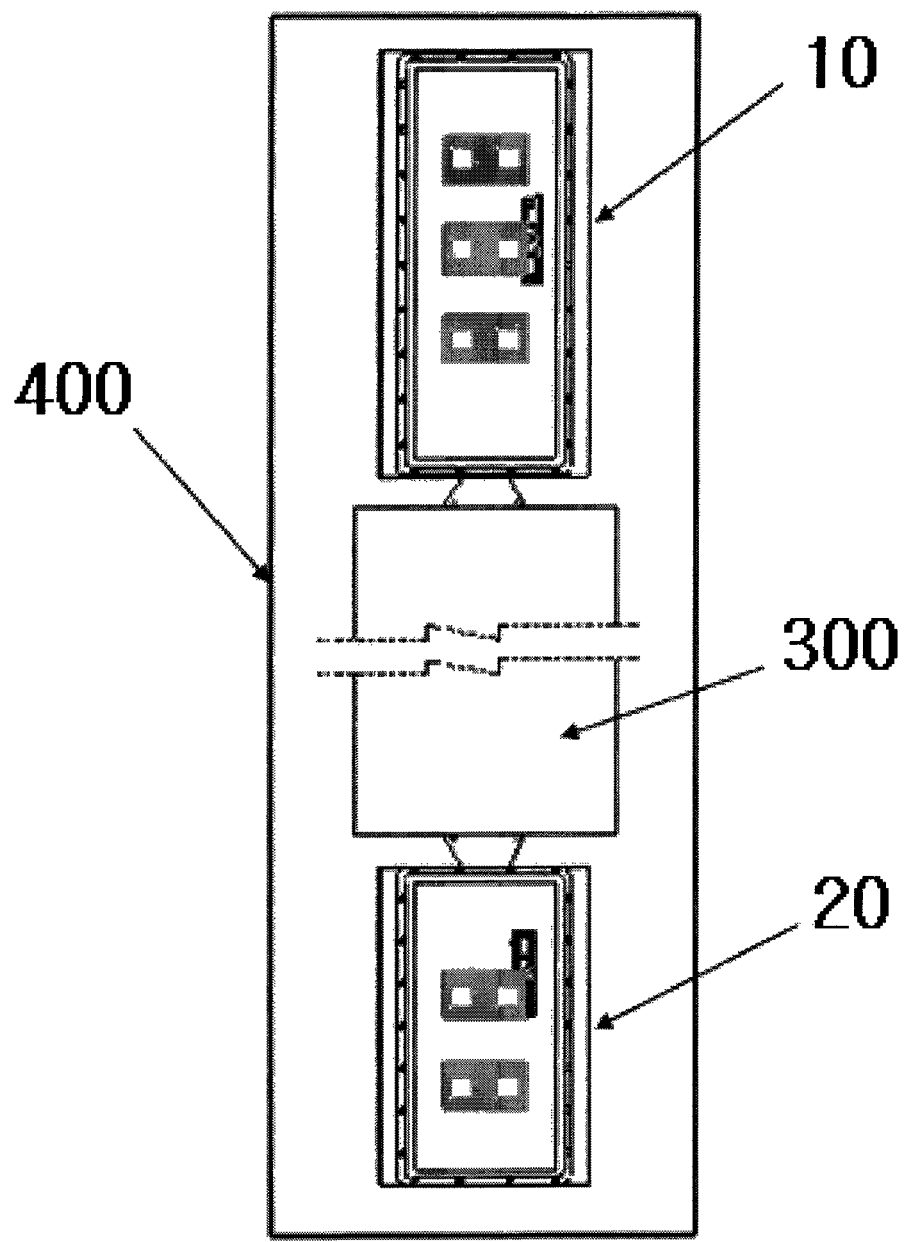
FIG. 6 illustrates a vertical separation front view of a radio frequency repeater for canceling feedback interference signal with built-in antenna according to the present invention.
Figure 7:
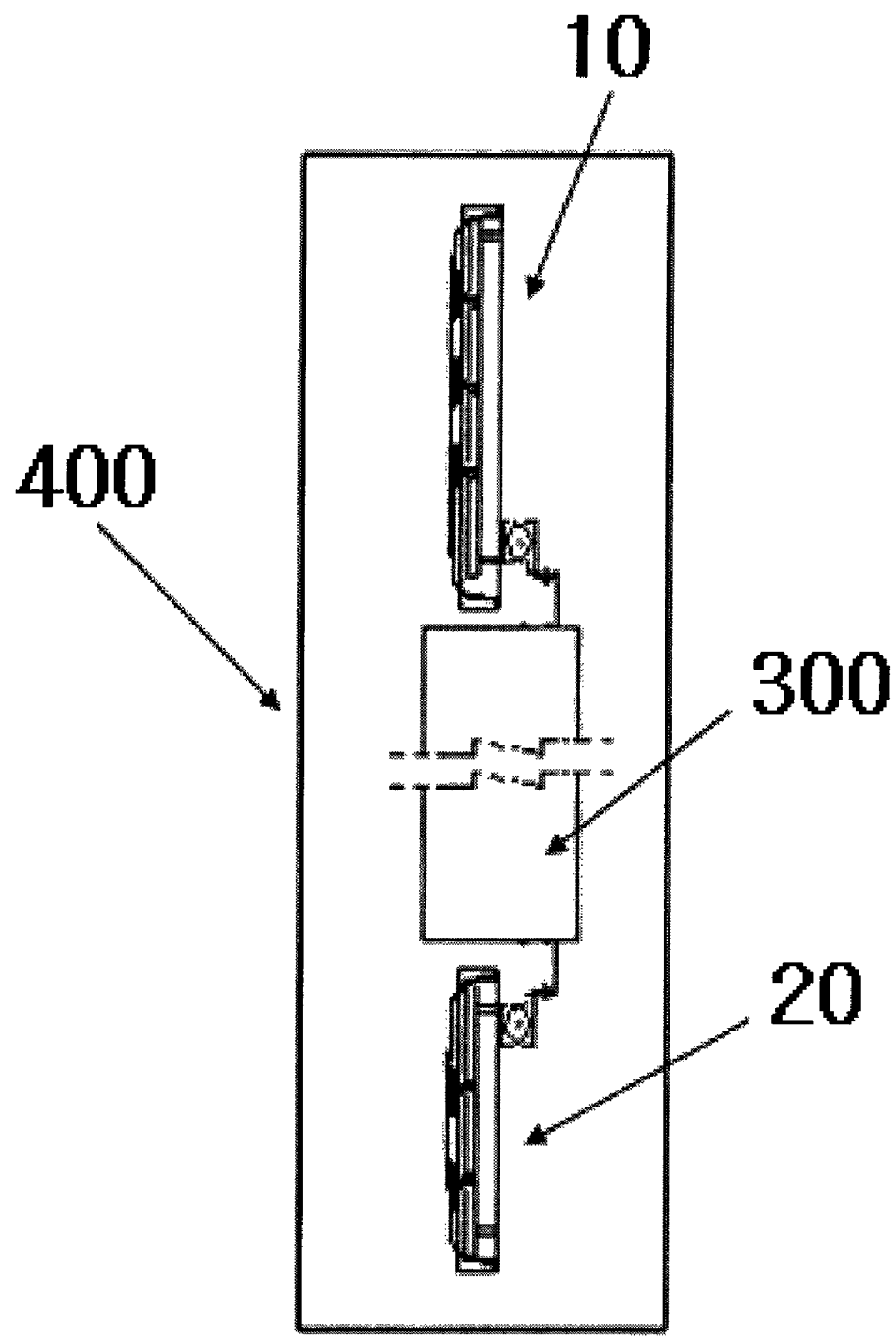
FIG. 7 illustrates a vertical separation side view of a radio frequency repeater for canceling feedback interference signal with built-in antenna according to the present invention.

FIG. 6 illustrates a vertical separation front view of a radio frequency repeater for canceling feedback interference signal with built-in antenna according to the present invention. FIG. 7 illustrates a vertical separation side view of a radio frequency repeater for canceling feedback interference signal with built-in antenna according to the present invention.

Figure 8:
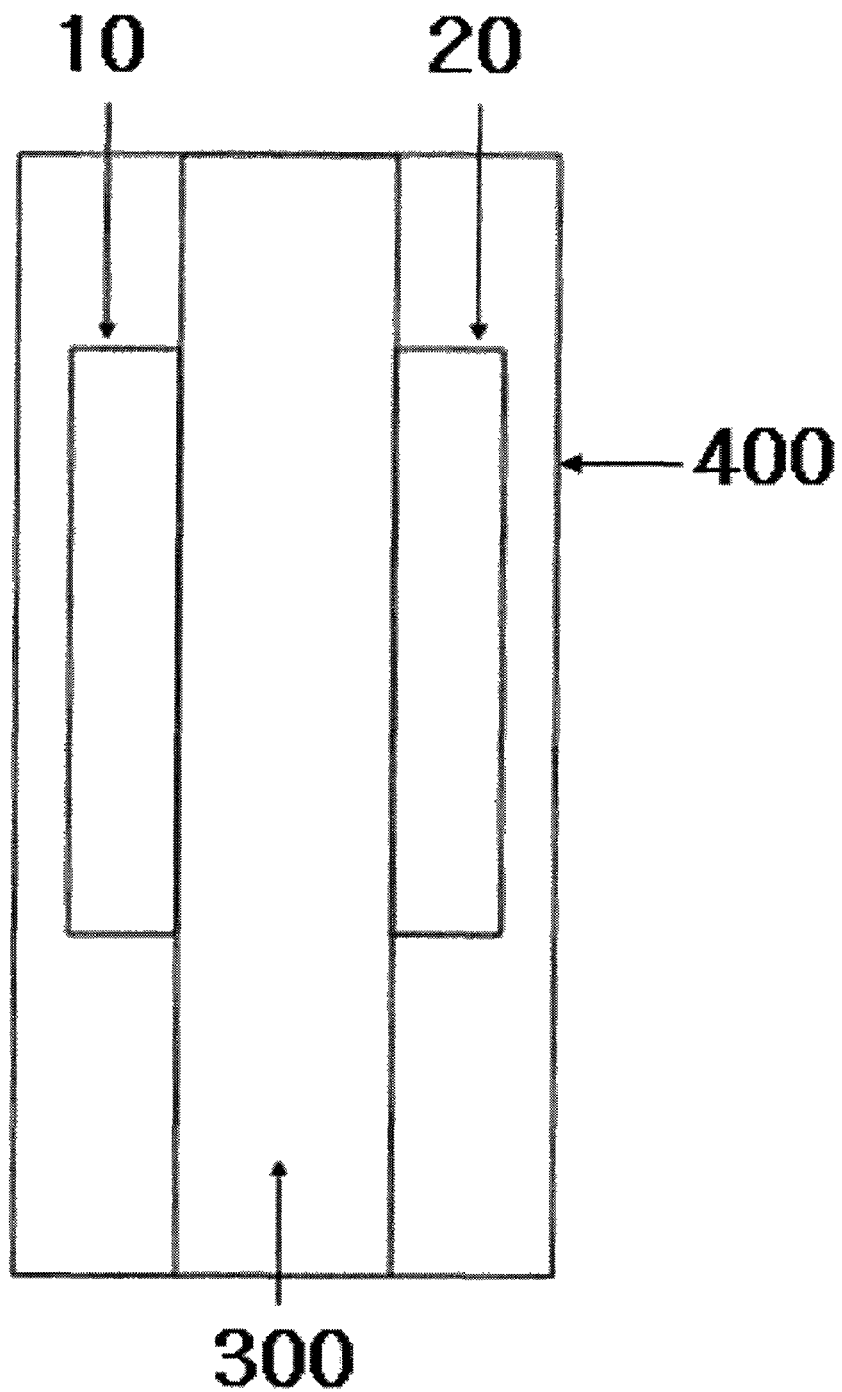
FIG. 8 illustrates a horizontal separation front view of a radio frequency repeater for canceling feedback interference signal with built-in antenna according to the present invention.
Figure 9:
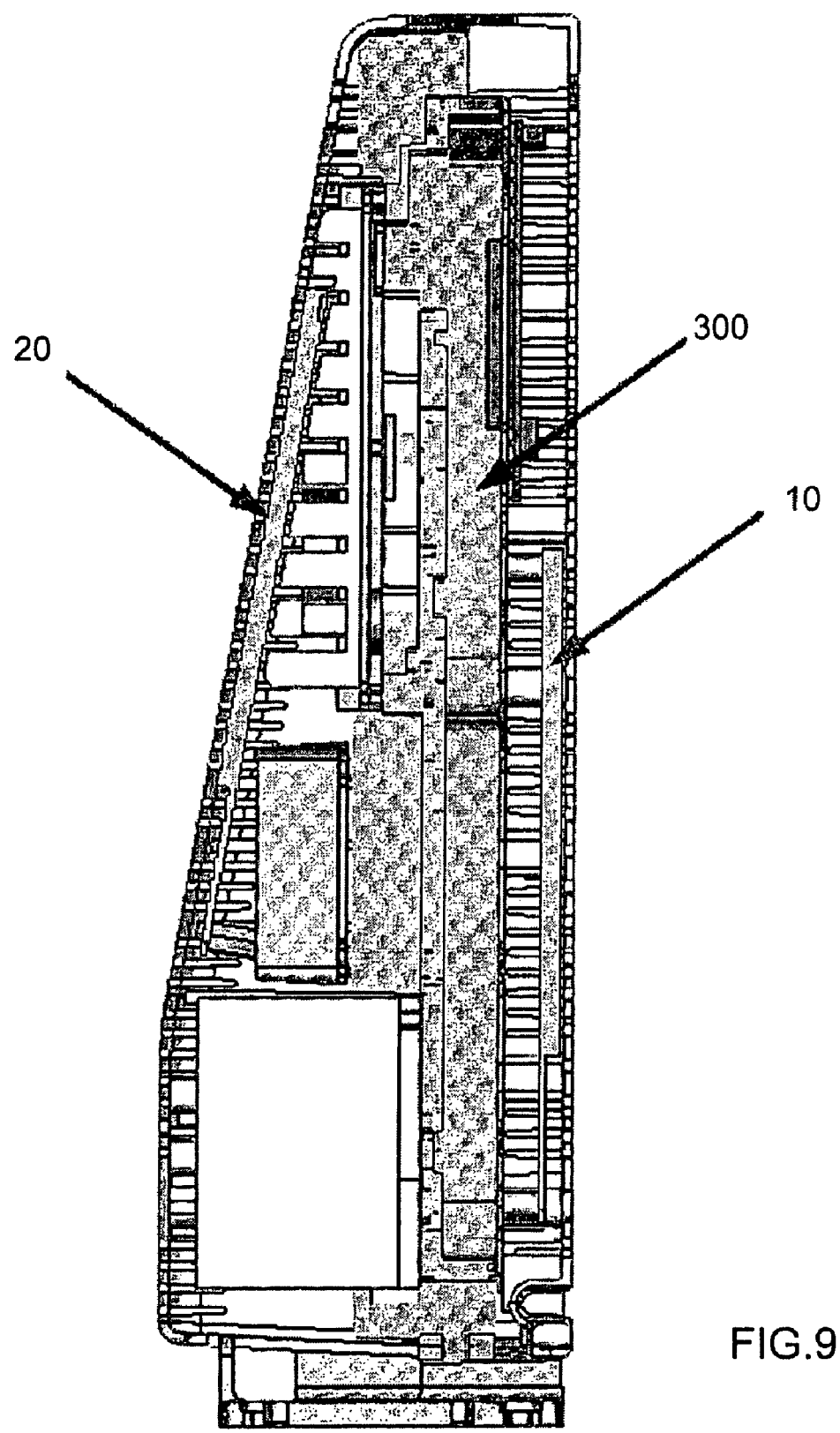
FIG. 9 illustrates a horizontal separation side view of a radio frequency repeater for canceling feedback interference signal with built-in antenna according to the present invention.

FIG. 8 illustrates a horizontal separation front view of a radio frequency repeater for canceling feedback interference signal with built-in antenna according to the present invention. FIG. 9 illustrates a horizontal separation side view of a radio frequency repeater for canceling feedback interference signal with built-in antenna according to the present invention.

As shown in FIG. 6 to FIG. 9, a radio frequency repeater (400) for canceling feedback interference signal with built-in antenna according to the present invention can be moved said donor antenna (10) and said coverage antenna (20) with vertical and horizontal based on an interference cancellation radio frequency repeater (300).

Thus, in case of vertical gain, a donor antenna (10) ensures directivity and front back ratio to array several patch antennas, and can be possible vertical tilting up to 20° and 360° to horizontal. This makes easy to be a directivity said donor antenna (10) to a base station direction.

Also, a coverage antenna (20) ensures directivity and front back ratio to array several patch antennas, and can be possible vertical tilting up to 20° and 360° to horizontal. This is for controlling a direction of an antenna about a service area.

And also, said donor antenna (10) and said coverage antenna (20) is characterized to be possible tilting to be moved an antenna angle as to up/down and vertical direction after fixing an interference cancellation radio frequency repeater (300).

The present invention is not limited to the above embodiment. As the present invention may be embodied in several forms without departing from the spirit or essential characteristics thereof, it should also be understood that the above-described examples are not limited by any of the details of the foregoing description, unless otherwise specified, but rather should be constructed broadly within its spirit and scope as defined in the appended claims, and therefore all changes and modifications that fall within the meets and bounds of the claims, or equivalences of such meets and bounds are therefore intended to be embraced by the appended claims.

The invention claimed is:

1. A radio frequency repeater is built-in a donor antenna receiving a transmitted sender signal from a base station to a mobile telecommunication radio frequency repeater and a coverage antenna radiating a repeated signal in said radio frequency repeater to a radio service area, and to prevent oscillation to cancel a feedback interference signal between said donor antenna and said coverage antenna, comprising:

a $1^{st}$ duplexer means for filtering a received signal from said donor antenna;

a downlink low noise amplifier means for amplifying filtered signal only for use-band in said $1^{st}$ duplexer;

a downlink frequency down converter means for receiving a signal which is amplified by said downlink low noise amplifier;

a downlink feedback cancellation module means for separating a received signal from the base station being inputted to said donor antenna and a feedback interference signal being inputted to said donor antenna radiating from said coverage antenna in a signal of said downlink frequency down converter and canceling the feedback interference signal;

a downlink frequency up converter means for up-converting frequency into a high frequency band for radiating a signal which the feedback interference signal is cancelled by said downlink feedback ICM (Interference Cancellation Module) to the service area;

a downlink power amplifier means for amplifying a signal of said downlink frequency up converter;

a $2^{nd}$ duplexer means for outputting to the coverage antenna with filtering the amplified signal in said downlink power amplifier, and for filtering a signal of a mobile telecommunication terminal which is radiated in the service area and received by said coverage antenna, conversely;

an uplink low noise amplifier means for amplifying low noise to receive filtered signal only for use band in said $2^{nd}$ duplexer;

an uplink frequency down-converter means for receiving the amplified signal by said uplink low noise amplifier and down-converting a frequency of the amplified signal by said uplink low noise amplifier;

an uplink feedback cancellation module means for separating a received signal from a terminal of the service area being inputted to said coverage antenna and a feedback interference signal being inputted to the coverage antenna radiating from said donor antenna in a signal of said uplink frequency down-converter and canceling the feedback interference signal;

an uplink frequency up converter means for up-converting a frequency into a high frequency band for radiating a signal which the feedback signal is cancelled by said uplink feedback ICM to the service area;

an uplink power amplifier means for amplifying the signal of said uplink frequency up converter; and a $1^{st}$ duplexer means for outputting a filtered signal of the amplified signal in said uplink power amplifier to the donor antenna.

2. The radio frequency repeater of claim 1, wherein said downlink and uplink feedback interference cancellation module, of the type comprising:

a receiving signal delay unit means for delaying a phase to a reverse phase signal about the signal of from the base station received from said receiving antenna and a re-received feedback interference signal from said transmission antenna;

a transmitting signal delay unit means for transmitting only the base station signal to be transmitted to said transmitting antenna;

a canceller means for sorting only the feedback interference signal by combining a reverse phase signal of said receiving signal delay unit and the signal from the base station before being transmitted; and an adder-subtracter means for sorting only the received signal from the base station by combining a transmitted reverse phase signal of the feedback interference signal from said canceller with the received signal of from the base station and the feedback interference signal.

3. The radio frequency repeater of claim 2, wherein said canceller has many cells for canceling the feedback interference signal of multi-path.

4. The radio frequency repeater of claim 2, wherein said isolation can be calculated as following equation:

Isolation=Gain−[$\log_{10}|W(n)|$−$\log_{10}|S'(n)|$].

5. The radio frequency repeater of claim 1, wherein said donor antenna and said coverage antenna, in which is possible a gain of vertical and horizontal by reference with the radio frequency repeater.

6. The radio frequency repeater of claim 5, wherein said donor antenna is configured to array many patch antennas.

7. The radio frequency repeater of claim 5, wherein said coverage antenna is configured to array many patch antennas.

8. The radio frequency repeater of claim 5, wherein said donor antenna and said coverage antenna is characterized to be possible tilting to be moved an antenna angle to up/down and vertical direction after fixing the interference cancellation of the radio frequency repeater.

9. A radio frequency repeater including a built-in donor antenna that receives a sender signal transmitted from a base station to a mobile telecommunication radio frequency repeater, and a coverage antenna that radiates a repeated signal in the radio frequency repeater to a radio service area, the radio frequency repeater preventing oscillation so as to cancel a feedback interference signal between the donor antenna and the coverage antenna, the radio frequency repeater comprising:

a $1^{st}$ duplexer for filtering a received signal from said donor antenna;

a downlink low noise amplifier for amplifying the filtered signal only in a use-band of said $1^{st}$ duplexer;

a downlink frequency down-converter for receiving and frequency down-converting an amplified filtered signal from said downlink low noise amplifier;

a downlink feedback interference cancellation module (ICM) that receives a signal from the downlink frequency down-converter and separates from said signal a first signal received at the donor antenna from the base station and a feedback interference signal radiating from the coverage antenna to the donor antenna, said downlink feedback ICM additionally canceling the feedback interference signal from said signal from the downlink frequency down-converter to recover said first signal;

a downlink frequency up-converter that receives said first signal from said downlink feedback ICM and up-converts the frequency if said signal into a high frequency band for radiating the recovered first signal to the service area;

a downlink power amplifier that receives and amplifies the up-converted recovered signal from the downlink frequency up-converter; and a $2^{nd}$ duplexer that filters the amplified signal output by the downlink power amplifier and outputs the filtered signal to the coverage antenna, said $2^{nd}$ duplexer additionally filtering a signal of a mobile telecommunication terminal which is radiated in the service area and received by said coverage antenna.

10. The radio frequency repeater of claim 9, additionally including:

an uplink low noise amplifier for amplifying the filtered signal from said $2^{nd}$ duplexer in the use band of said $2^{nd}$ duplexer;

an uplink frequency down-converter for receiving and frequency down-converting an amplified filtered signal received from said uplink low noise amplifier;

an uplink feedback interference cancellation module (ICM) that receives a signal from the downlink frequency down-converter and separates from said signal a second signal received by the coverage antenna from a terminal in the service area and a second feedback interference signal provided to the coverage antenna from the donor antenna, said uplink feedback ICM additionally canceling the second feedback interference signal from said signal from the uplink frequency down-converter to recover said second signal;

an uplink frequency up-converter that receives and frequency up-converts said recovered second signal from the uplink feedback ICM into a high frequency band for transmitting said recovered second signal to the service area;

an uplink power amplifier for amplifying the frequency up-converted recovered second signal output by said uplink frequency up-converter; and said $1^{st}$ duplexer additionally outputting to the donor antenna the amplified, frequency up-converted recovered second signal output by said uplink power amplifier.

* * * * *